Oct. 8, 1935.  J. R. W. THOMAS  2,016,464
SLIPPING COUPLING DEVICE
Filed Sept. 21, 1933
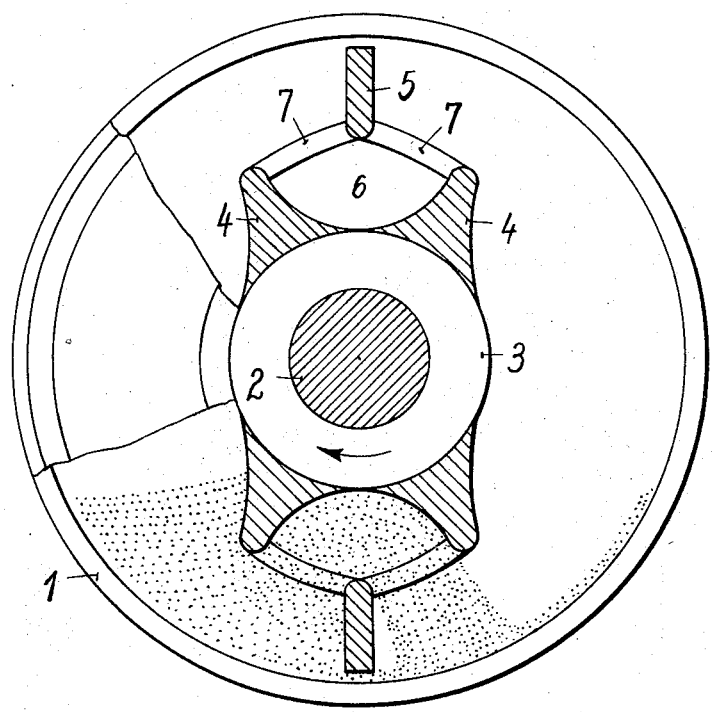

Patented Oct. 8, 1935

2,016,464

UNITED STATES PATENT OFFICE 2,016,464

SLIPPING COUPLING DEVICE

Johannes Robert Wilhelm Thomas, Dresden, Germany

Application September 21, 1933, Serial No. 690,425
In Germany October 11, 1932

3 Claims. (Cl. 192—58)

There are known slipping coupling means in which liquid, pulverized or granular filling substances are used and which consist of a casing and a bladed wheel rotatable within said casing and provided with passages in the blades for the filling substance. In this kind of coupling the filling substance constitutes the power transmitting means, the efficiency of the device being dependent mainly on the manner in which the filling substance under the influence of the centrifugal force is acted upon by the blades.

According to this invention I provide instead of single blades, blades comprising several parts causing the filling substance to pass through them along an arc-shaped path. Thereby the efficiency is increased both as regards duration and amount of the initial power transmitting momentum, since the filling substance by being positively guided through the arc-shaped passages during the initial movement and any subsequent slipping movement is prevented from forming whirls which destroy power without transmitting it. The said passages of arc-shape amass the filling substance after it has passed one blade and before passing the next blade and increase the pressure by the banking within the arc-shaped passages of the blades.

On the drawing on which my invention is illustrated I have shown a cross-section of the bladed wheel, the casing being shown in plan view.

As in similar devices of this kind, the casing I surrounds the hub 3 mounted upon the shaft 2, the hub carrying the blades. The latter according to my invention consist of several parts. The lateral parts 4 are fixed directly upon the hub 3 driven by the shaft 2 and are formed with a trough-like recess. They are spaced radially a considerable distance from the inner wall of the casing I. Connected by ribs 7 with the parts 4 is a centrally disposed part 5, which is spaced radially only a small distance from the inner wall of the casing I. In this way passages 6 are formed between the outer part 5 and the inner parts 4 so designed as to force the filling substance to follow an arc-shaped path when passing through the entire blade. The filling substance is shown by the dots at the moment shortly after the start of a revolution of shaft 2 in the direction of the arrow.

It is possible to regulate the flow of the filling substance through the arc-shaped passages by the single parts of the entire blade being given different shapes. Instead of two blades one can, of course, provide a greater number thereof and also compose them of more than three parts.

I claim:

1. In a coupling of the type described, the combination with a closed cylindrical casing containing fluent material, of a rotatable shaft extending through said casing, and a bladed wheel mounted on said shaft, each blade formed with a trough-like recess constituting an arc-shaped passage for the material contained in the casing so as to compel said material to bank in front of each succeeding blade as said wheel rotates.

2. In a coupling of the type described, the combination with a closed cylindrical casing containing fluent material, of a rotatable shaft extending through said casing, and a bladed wheel mounted on said shaft, each blade comprising two lateral parts secured to said wheel being spaced a substantial distance from the inner wall of said casing and forming an arc-shaped trough, a centrally disposed part slightly spaced from the inner wall of said casing, and ribs connecting said last-named part to said lateral parts.

3. In a coupling of the type described, the combination with a closed cylindrical casing containing fluent material, of a rotatable shaft extending through said casing, and a bladed wheel mounted on said shaft, each blade being provided with a trough-shaped opening forming a curved passage for the material contained in the casing and a projection back of said opening adapted to direct the material toward the inner wall of said casing.

JOHANNES THOMAS.